(12) United States Patent
Suh et al.

(10) Patent No.: US 10,309,825 B2
(45) Date of Patent: Jun. 4, 2019

(54) REDUCING NOISE IN A DISTRIBUTED ACOUSTIC SENSING SYSTEM DOWNHOLE

(71) Applicant: Halliburton Energy Services, Inc., Houston, TX (US)

(72) Inventors: Kwang Il Suh, Stevenson Ranch, CA (US); Ira Jeff Bush, Los Angeles, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/554,376

(22) PCT Filed: Apr. 7, 2015

(86) PCT No.: PCT/US2015/024784
§ 371 (c)(1),
(2) Date: Aug. 30, 2017

(87) PCT Pub. No.: WO2016/164002
PCT Pub. Date: Oct. 13, 2016

(65) Prior Publication Data
US 2018/0245971 A1 Aug. 30, 2018

(51) Int. Cl.
*G01H 9/00* (2006.01)
*G01V 1/22* (2006.01)

(52) U.S. Cl.
CPC ............ *G01H 9/004* (2013.01); *G01V 1/226* (2013.01); *G01V 2210/1429* (2013.01)

(58) Field of Classification Search
CPC . G01H 9/004; G01V 1/226; G01V 2210/1429
(Continued)

(56) References Cited

U.S. PATENT DOCUMENTS 5,194,847 A 3/1993 Taylor et al.
7,030,971 B1 4/2006 Payton
(Continued)

FOREIGN PATENT DOCUMENTS

GB 2397879 8/2004
KR 10-2011-0112086 * 10/2011
(Continued)

OTHER PUBLICATIONS

"RIO Colorado Tunable Laser Source", Retrieved from the Internet at least as early as May 2013, http://www.rio-inc.com/_products/tunable.html, 2.
(Continued)

*Primary Examiner* — Daniel L Murphy
(74) *Attorney, Agent, or Firm* — Kilpatrick Townsend and Stockton LLP (57) ABSTRACT

A distributed acoustic sensing system for use in a wellbore can include a shutter positioned between an amplifier and an optical-wave flow controller of the distributed acoustic sensing system for reducing optical noise in the distributed acoustic sensing system. The distributed acoustic sensing system can also include a controller operable to transmit a signal to the shutter to (i) open the shutter for allowing an optical pulse to transmit through the shutter, and (ii) close the shutter for preventing an extraneous optical waveform, that generates at least a portion of the optical noise, from transmitting through the shutter.

20 Claims, 6 Drawing Sheets

(58) Field of Classification Search
USPC .......................................................... 367/25
See application file for complete search history.

(56) References Cited

U.S. PATENT DOCUMENTS

| | | | |
|---|---|---|---|
| 7,274,441 | B2 | 9/2007 | Payton |
| 7,872,736 | B2 | 1/2011 | Rogers et al. |
| 7,946,341 | B2 | 5/2011 | Hartog et al. |
| 2009/0238513 | A1 | 9/2009 | Hao et al. |
| 2012/0277995 | A1 | 11/2012 | Hartog et al. |
| 2013/0021615 | A1 | 1/2013 | Duncan et al. |
| 2013/0021874 | A1* | 1/2013 | Hartog ............... E21B 47/101 367/31 |
| 2014/0138528 | A1 | 5/2014 | Pope et al. |
| 2014/0152995 | A1 | 6/2014 | Dong et al. |
| 2014/0163889 | A1 | 6/2014 | Finfer et al. |

FOREIGN PATENT DOCUMENTS

| | | |
|---|---|---|
| KR | 1020110112086 | 10/2011 |
| WO | 2008098380 | 8/2008 |
| WO | 2009011766 | 1/2009 |
| WO | 2012068558 | 5/2012 |
| WO | 2015057224 | 4/2015 |

OTHER PUBLICATIONS

Fischer , "Applying DAS in Oil & Gas Operations", Novus Light Technologies, Today News and Analysis from the world of light, Oct. 8, 2012, 4 pages.
International Patent Application No. PCT/US2015/024784 , "International Search Report and Written Opinion", dated Dec. 11, 2015, 15 pages.
Varshney et al., "Raman Amplification Properties of Photonic Crystal Fibers", International Journal of Microwave and Optical Technology, Division of Media and Network Technologies, vol. 1, No. 1, Jun. 2006, 8 pages.
Xu et al., "Fiber Strain Measurement for Wide Region Quasi Distributed Sensing by Optical Correlation Sensor with Region Separation Techniques", Journal of Sensors, 2010, 11 pages.

* cited by examiner

REDUCING NOISE IN A DISTRIBUTED ACOUSTIC SENSING SYSTEM DOWNHOLE

CROSS-REFERENCE TO RELATED APPLICATIONS

This is a U.S. national phase under 35 U.S.C. 371 of International Patent Application No. PCT/US2015/024784 titled "Reducing Noise In A Distributed Acoustic Sensing System Downhole" and filed Apr. 7, 2015, the entirety of which is incorporated herein by reference.

TECHNICAL FIELD

The present disclosure relates generally to devices for use in well systems. More specifically, but not by way of limitation, this disclosure relates to reducing noise in a distributed acoustic sensing system downhole.

BACKGROUND

A well system (e.g., an oil or gas well for extracting fluid or gas from a subterranean formation) can include sensors for determining characteristics of an environment in a wellbore. For example, a sensor can include a distributed acoustic sensing (DAS) system for detecting acoustic events in the wellbore. It can be challenging to detect acoustic events using a DAS system.

DETAILED DESCRIPTION

Certain aspects and features of the present disclosure relate to reducing noise in a distributed acoustic sensing (DAS) system downhole. The DAS system can include a transceiver (e.g., an interrogator unit) coupled to a fiber optic cable for sensing acoustic waves. The transceiver can generate and transmit optical pulses down the fiber optic cable. In some examples, the transceiver can generate extraneous optical waves that can generate optical noise in the DAS system. This optical noise can be increased when an end of the fiber optic cable is terminated with a component that causes large reflections (e.g., reflections of 0.1% or more of the original optical energy being reflected). The optical noise can corrupt optical signals propagating through the fiber optic cable and/or saturate DAS system components, such as a detector for detecting back-scattered optical signals (e.g., resulting from the optical pulses interacting with scatter sites of the fiber optic cable). In some examples, a shutter can be positioned in the transceiver for reducing or removing the optical noise generated by the transceiver. Examples of the shutter can include an acoustic optical modulator, an integrated optical switch, an integrated optic Mach-Zehnder Interferometer, a saturable absorber, or a variable optical attenuator. The shutter can (i) open to allow optical pulses generated by the transceiver to pass through the shutter to the fiber optic cable, and (ii) close to prevent the extraneous optical waves from transmitting through the shutter to the fiber optic cable.

In some examples, the transceiver can include an amplifier for increasing a magnitude of the optical pulses. The amplifier can generate the extraneous optical wave. In some examples, the extraneous optical wave can be an amplified spontaneous emission (ASE). The extraneous optical wave can propagate through the fiber optic cable and generate optical noise in the DAS system. In such an example, the shutter can be positioned between the amplifier and the fiber optic cable for reducing or removing the optical noise generated by the amplifier.

In some examples, the transceiver can include a controller for operating the shutter. The controller can also operate a pulser of the transceiver. The controller can synchronize the opening and closing of the shutter with the output of optical pulses by the pulser. For example, the controller can cause the pulser to output an optical pulse during a time in which the shutter is open. The controller can close the shutter when the pulser is not outputting an optical pulse. When the shutter is closed, the shutter can prevent extraneous optical waves from the amplifier (or other DAS system components) from propagating through the fiber optic cable. This can reduce or eliminate the optical noise generated by the amplifier (or other DAS system components).

In some examples, the transceiver can include another shutter. The shutter can be positioned between an optical-wave flow controller (e.g., a circulator, beam splitter, or fiber optic coupler) and the detector. The controller can operate the other shutter to prevent optical noise from saturating the detector. For example, the transceiver can transmit an optical pulse through the optical-wave flow controller and down the fiber optic cable. Scatter sites in the fiber optic cable can cause backscattered optical waves to propagate back toward the transceiver. The optical-wave flow controller can relay the backscattered optical waves to the detector. In some examples, the controller can open the shutter to allow the backscattered optical waves to reach the detector. The optical pulse and other optical noise can be reflected back toward the transceiver, for example, upon the optical pulse reaching a terminating component at the end of the fiber optic cable (or another reflection point along the fiber optic cable). The optical-wave flow controller can relay the reflected optical pulse and optical noise to the detector. In some examples, the controller can close the shutter to prevent the reflected optical pulse and optical noise from reaching the detector. In this manner, the shutter can selectively attenuate the reflected optical pulses and optical noise to reduce or prevent saturation of the detector (e.g., an optical amplifier of the detector).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
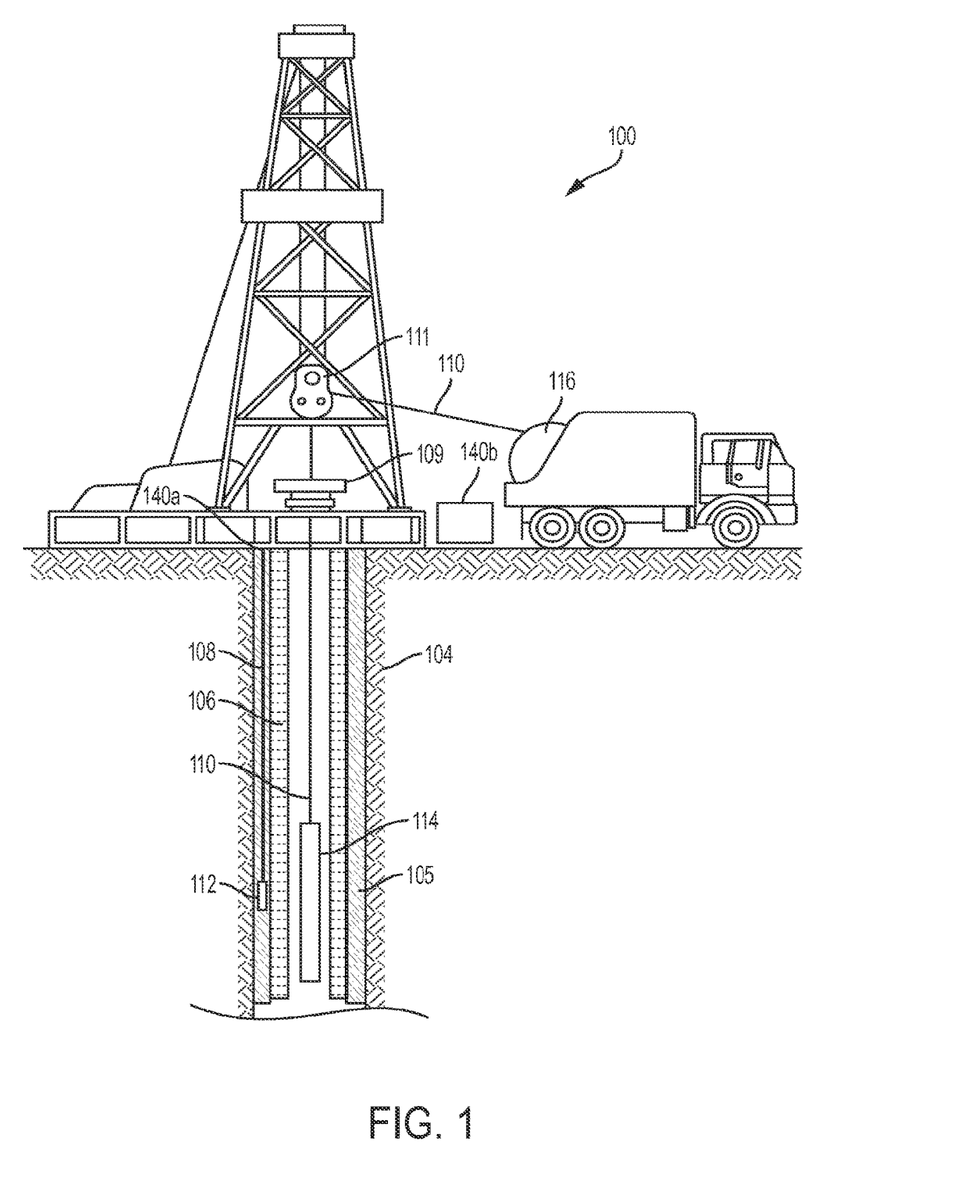
FIG. 1 is a cross-sectional view of an example of a well system that includes a system for reducing noise in a distributed acoustic sensing (DAS) system downhole according to some aspects.

FIG. 1 is a cross-sectional view of an example of a well system 100 that includes a system for reducing noise in a DAS system downhole. The well system 100 includes a wellbore extending through various earth strata. The wellbore extends through a hydrocarbon bearing subterranean formation 104. A casing string 106 extends from the surface 109 to the subterranean formation 104. The casing string 106 can provide a conduit through which formation fluids, such as production fluids produced from the subterranean formation 104, can travel from the wellbore to the surface 109. The casing string 106 can be coupled to the walls of the wellbore via cement. For example, a cement sheath 105 can be positioned or formed between the casing string 106 and the walls of the wellbore for coupling the casing string 106 to the wellbore.

The well system 100 can also include at least one well tool 114 (e.g., a formation-testing tool). The well tool 114 can be coupled to a wireline 110, slickline, or coiled tubing that can be deployed into the wellbore. The wireline 110, slickline, or coiled tubing can be guided into the wellbore using, for example, a guide 111 or winch. In some examples, the wireline 110, slickline, or coiled tubing can be wound around a reel 116.

In some examples, the well system 100 can include one or more DAS systems. The DAS systems can detect acoustic events in the wellbore. One DAS system can include a transceiver 140a (e.g., a DAS interrogator) coupled to a fiber optic cable 108. The fiber optic cable 108 can be positioned on or embedded within a cement sheath 105 or a casing string 106, or can be positioned elsewhere in the wellbore. The transceiver 140a can be positioned aboveground (e.g., above the well surface 109) or below ground. In some examples, one or more sensors 112 can be coupled to the fiber optic cable 108. The sensors 112 can detect an environmental condition in, or other characteristic of, the wellbore and transmit associated data to the transceiver 140a. Examples of the sensor 112 can include a temperature sensor, pressure sensor, vibration sensor, acoustic sensor (e.g., a microphone), strain gauge, flow sensor, tilt sensor, accelerometer, gyroscope, inclinometer, or any combination of these. For example, a pressure sensor can be coupled to the end of the fiber optic cable 108 for detecting a pressure in the wellbore and transmitting associated pressure data via optical signals to the transceiver 140a.

The well system 100 can additionally or alternatively include another DAS system. For example, the other DAS system can include a transceiver 140b coupled to the wireline 110. The wireline 110 can include a fiber optic cable. In some examples, the fiber optic cable can be terminated by the well tool 114 or a sensor of the well tool 114. For example, the well tool 114 can include a sensor coupled to the end of the fiber optic cable. In some examples, the sensor can be configured substantially the same as sensor 112. The sensor can detect environmental conditions in the wellbore, characteristics of the well tool 114, or other parameters and transmit associated sensor signals (via optical pulses) to the transceiver 140b.

Any number or configuration of DAS systems can be included in the wellbore. For example, multiple fiber optic cables can be coupled to a single transceiver 140a. In one such example, fiber optic cable 108 and a fiber optic cable of wireline 110 can both be coupled to transceiver 140a.

In some examples, the DAS system (including the system for reducing noise in the DAS system) can be implemented in other contexts. For example, the DAS system can be part of a municipal pipeline system (e.g., a water pipeline system), civil structure (e.g., a nuclear, energy, or communication system), transportation system (e.g., a railroad system), or a security system (e.g., for securing supply routes or border monitoring).

Figure 2:
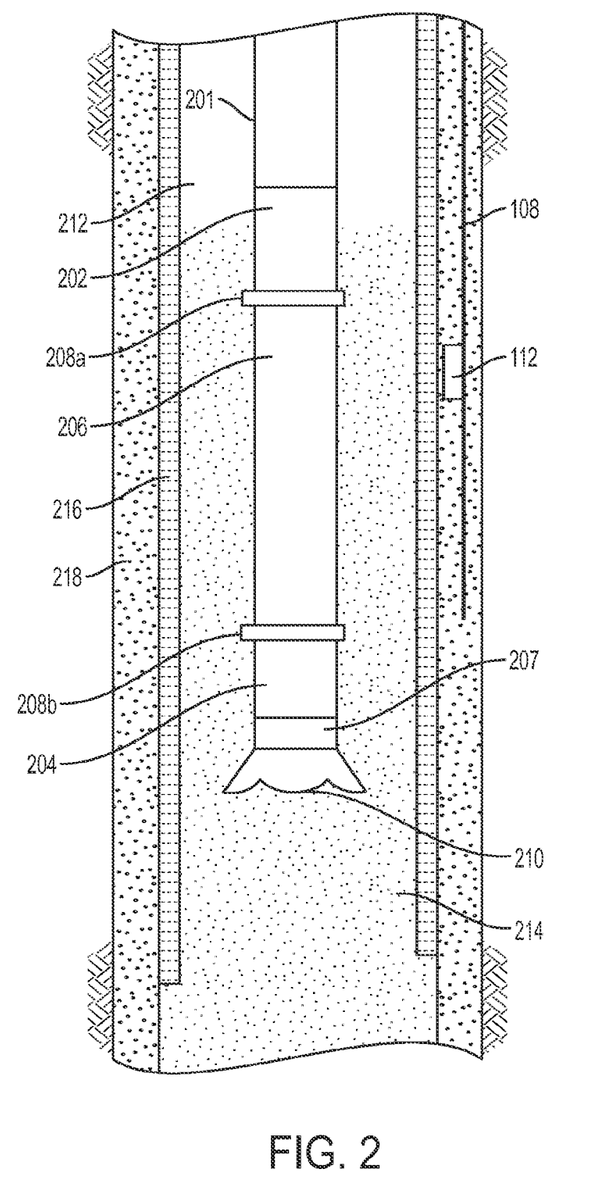
FIG. 2 is a cross-sectional view of an example of part of a well system that includes a system for reducing noise in a DAS system downhole according to some aspects.

FIG. 2 is a cross-sectional view of an example of part of a well system that includes a system for reducing noise in a DAS system downhole according to some aspects. The well system includes a wellbore. The wellbore can include a casing string 216 and a cement sheath 218. In some examples, the wellbore can include fluid 214. The fluid 214 (e.g., mud) can flow in an annulus 212 positioned between the well tool 201 and a wall of the casing string 216.

A well tool 201 (e.g., logging-while-drilling tool) can be positioned in the wellbore. The well tool 201 can include various subsystems 202, 204, 206, 207. For example, the well tool 201 can include a subsystem 202 that includes a communication subsystem. The well tool 201 can also include a subsystem 204 that includes a saver subsystem or a rotary steerable system. A tubular section or an intermediate subsystem 206 (e.g., a mud motor or measuring-while-drilling module) can be positioned between the other subsystems 202, 204. In some examples, the well tool 201 can include a drill bit 210 for drilling the wellbore. The drill bit 210 can be coupled to another tubular section or intermediate subsystem 207 (e.g., a measuring-while-drilling module or a rotary steerable system). In some examples, the well tool 201 can also include tubular joints 208a, 208b.

The well system can include a DAS system. In one example, a fiber optic cable 108 of the DAS system can be positioned in the cement sheath 218. In another example, a fiber optic cable 108 of the DAS system can be positioned in the well tool 201 or elsewhere in the wellbore. In some examples, one or more sensors 112 can be coupled to the fiber optic cable 108 for detecting a characteristic of the well tool 201, the wellbore, or both.

Figure 3:
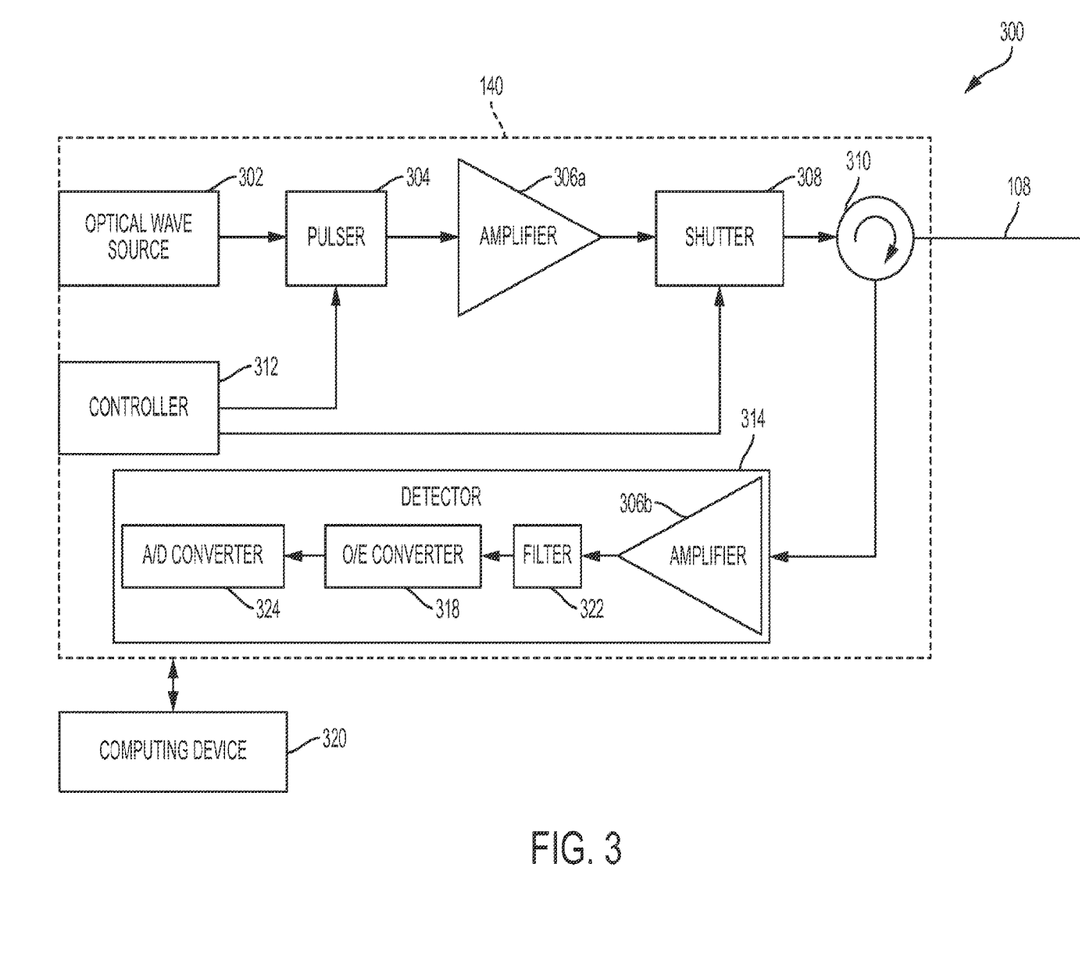
FIG. 3 is a block diagram of an example of a DAS system according to some aspects.

FIG. 3 is a block diagram of an example of a DAS system 300 according to some aspects. The DAS system 300 includes a transceiver 140 (e.g., an interrogator) and a fiber optic cable 108.

In some examples, the transceiver 140 can include an optical wave source 302. An example of the optical wave source can include a laser. The optical wave source 302 can generate a continuous optical wave for use in transmitting optical signals via the fiber optic cable 108. In some examples, the continuous optical wave can have a high frequency (e.g., 189 terahertz) and a spectral linewidth between 1 kHz and 100 kHz.

Figure 4:
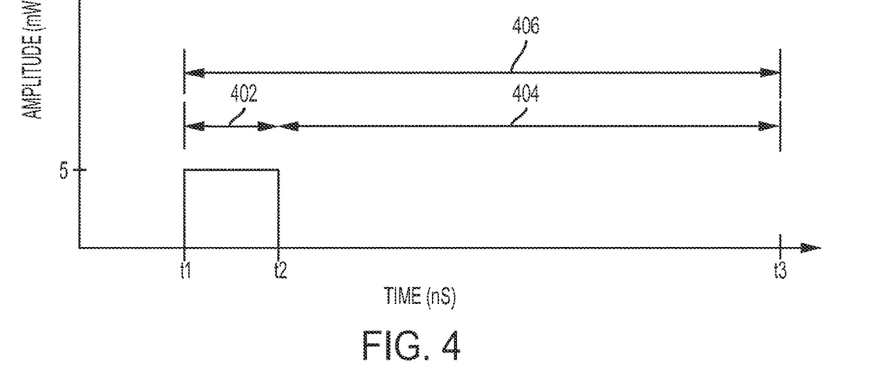
FIG. 4 is a graph depicting an example of an optical pulse in a DAS system downhole according to some aspects.

The transceiver 140 can include a pulser 304. The pulser 304 can be active or passive. An example of the pulser 304 can include an optical switch. The pulser 304 can be operable to receive the continuous optical wave from the optical wave source 302 and generate optical pulses from the continuous optical wave. For example, the pulser 304 can receive the continuous optical wave from the optical wave source 302 and responsively generate a square wave or another high-extinction pulse from the continuous optical wave. Each optical pulse can have an "on time" (e.g., time 402 of FIG. 4) and an "off time" (e.g., time 404 of FIG. 4), the combination of which can generate a period of the optical pulse (e.g., period 406 of FIG. 4). The pulser 304 can generate the on time by allowing the continuous optical wave through the pulser 304 for a time period. The pulser 304 can generate the off time by blocking the continuous optical wave for another time period. In some examples, the ratio of the on time to the off time can be at least 1:1000. For example, an optical pulse can have an on time of between 5 nanoseconds (nS) and 100 nS, and an off time of 100 microseconds (μS). Such an optical pulse can have an on-time to off-time ratio of between 1:1000 and 1:20000. In some examples, the optical pulses can include an amplitude of between 1 milliwatt (mW) and 20 mW.

The transceiver 140 can include an amplifier 306a. An example of the amplifier 306a can include an Erbium-doped fiber amplifier. The amplifier 306a can be operable to receive optical pulses from the pulser 304 and generate amplified optical pulses. For example, the amplifier 306a can detect the presence of the optical pulses and responsively increase an amplitude of the optical pulses to generate the amplified optical pulses. The amplifier 306a can transmit the amplified optical pulses to an optical-wave flow controller 310.

The transceiver 140 can include the optical-wave flow controller 310 operable to direct the flow of optical waves through the DAS system 300. Examples of the optical-wave flow controller 310 can include a circulator, a fiber optic coupler, a beam splitter, or any combination of these. The optical-wave flow controller 310 can be active or passive. In some examples, the optical-wave flow controller 310 can include three or more ports. The optical-wave flow controller 310 can receive an optical wave at one port and responsively output the optical wave via another one of the ports. For example, the optical-wave flow controller 310 can receive the amplified optical pulses from the amplifier 306 via a first port. The optical-wave flow controller 310 can transmit the amplified optical pulses out a second port coupled to the fiber optic cable 108. This can cause the amplified optical pulses to propagate down the fiber optic cable 108. The amplified optical pulses can interact with scatter sites along the fiber optic cable 108, generating backscattered optical waves. The optical-wave flow controller 310 can receive the backscattered optical waves from the fiber optic cable 108 via the second port. The optical-wave flow controller 310 can transmit the backscattered optical waves out a third port to a detector 314.

The transceiver 140 can transmit optical pulses down the fiber optic cable 108. Perturbations in the fiber optic cable 108 can cause minute static and dynamic strains of the fiber optic cable 108. The strains can cause displacements in the scatter sites, Rayleigh elements, and/or other partially reflective elements within the fiber optic cable 108 (e.g., within a guided-wave portion of the fiber optic cable 108). The displacements can cause the optical intensity of the backscattered optical waves to change (e.g., via interferometric recombination of the multiple distributed backscattered and/or back-reflected optical waves). In some examples, the backscattered optical waves can interfere with one another, interfere with other optical waves propagating through the fiber optic cable 108, or both. This interference can generate a baseline amount of excess, optical noise.

Figure 5:
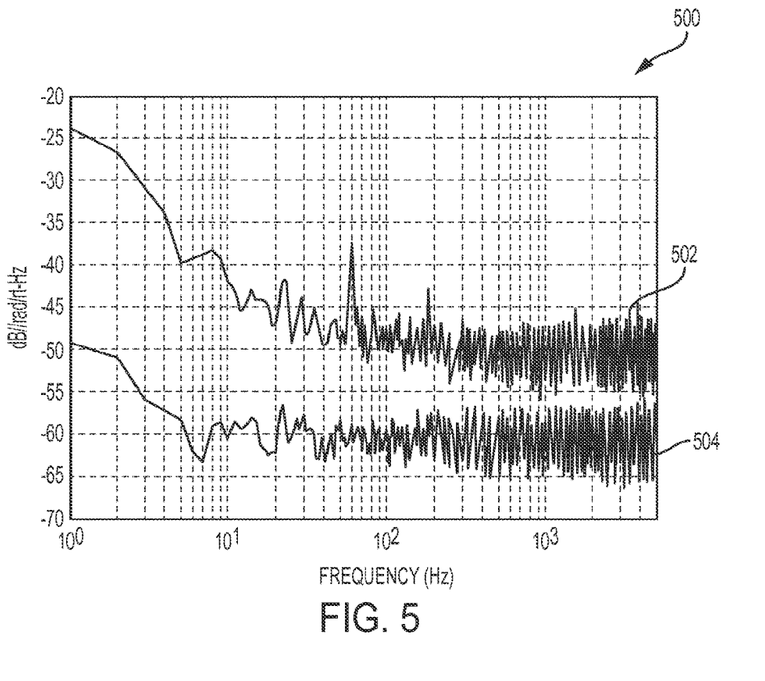
FIG. 5 is a graph depicting an example of a baseline optical noise signal when there is no additional noise in the DAS system and another optical noise signal when there is additional noise in the DAS system according to some aspects.

In some examples, the amplifier 306a and/or an amplifier 306b of the detector 314 can generate additional noise. The additional noise can be an amplified spontaneous emission. The additional noise can be in the form an extraneous, continuous optical wave transmitted down the fiber optic cable 108. The continuous optical wave can have a wide bandwidth and a low amplitude. In some examples, the additional noise from one or both of the amplifiers 306a-b can interfere with the baseline optical noise to generate a combined, high amplitude noise signal. For example, FIG. 5 is a graph depicting an example of a baseline optical noise signal 504 when there is no additional noise in the DAS system and another optical noise signal 502 when there is additional noise (from the amplifiers 306a-b) in the DAS system. In some examples, the optical noise signals 502, 504 can be generated by demodulating, processing, and normalizing (e.g., to a 1 Hz noise band) signals output by the detector 314. Optical noise signal 502 can represent a combined noise signal generated, at least in part, from the baseline optical noise signal 504 and the noise from the amplifiers 306a-b. In some examples, the optical noise signal 502 can include, at least in part, noise from the amplifier 306b depopulating and/or saturating. For example, if the amplifier 306b becomes saturated, it can take up to 2 milliseconds for the amplifier 306b to recover. During the recovery period, a gain of the amplifier 306b can be low. This can cause the backscattered optical waves to attenuate to the point where the optical noise increases. The optical noise signal 502 can be a few decibels (dB) to tens of decibels (dB) higher than the baseline optical noise signal 504. In some examples, the high amplitude of the optical noise signal 502 can saturate the amplifier 306b. It can be desirable to reduce (or remove) the excess noise generated by the amplifiers 306a-b from the DAS system 300.

In some examples, the transceiver 140 can include a shutter 308 for removing the additional noise generated by the amplifier 306. The shutter 308 can include an acoustic optical modulator, an integrated optical switch, an integrated optic Mach-Zehnder Interferometer, a saturable absorber, a variable optical attenuator, or any combination of these. In some examples, the shutter 308 can be positioned between the amplifier 306a and the optical-wave flow controller 310. The shutter 308 can include (i) an open position for allowing an optical pulse to pass through the shutter 308 and (ii) a closed position for preventing an optical wave from passing through the shutter 308. The shutter 308 can be operable to switch between the open position and the closed position responsive to one or more signals from a controller 312. For example, the shutter 308 can receive one signal from the controller 312 and switch to the open position. The shutter 308 can receive another signal from the controller 312 and switch to the closed position.

Figure 6:
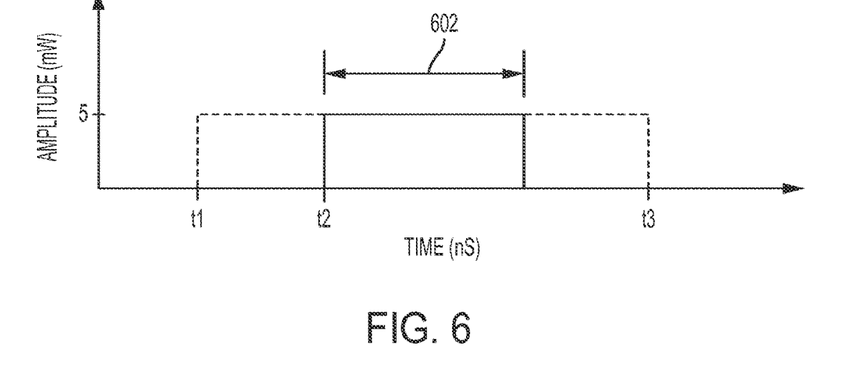
FIG. 6 is a graph depicting an example of synchronizing the output of an optical pulse with the opening of a shutter for reducing noise in a DAS system downhole according to some aspects.

The controller 312 can coordinate the output of each optical pulse from the pulser 304 with the opening and closing of the shutter 308. This can allow the optical pulses to flow through the shutter 308. For example, referring to FIG. 6, the controller 312 can cause the shutter 308 to be open between times $t_1$ and $t_3$ (as indicated by the dashed lines) and the pulser 304 to output a pulse at time $t_2$. In one example, if the width 602 (e.g., the on time) of an optical pulse is 10 nS, the shutter 308 can be open for 20 nS. The controller 312 can close the shutter 308 during the off time between optical pulses. In some examples, the controller 312 can synchronize the opening and closing of the shutter to as close to the width 602 of the optical pulse as is technically feasible. This can cause the shutter 308 to block extraneous optical waves (e.g., noise) from the amplifier 306 or other components of the DAS system 300. In some examples, blocking or reducing the noise from the amplifier 306 can reduce the overall noise in the DAS system 300, and prevent saturation of components of the DAS system 300, without compromising the performance of the DAS system 300.

The controller 312 can include analog components or digital components for controlling the pulser 304 and the shutter 308. For example, the controller 312 can include capacitors, resistors, inductors, integrated circuit components, processors, crystal oscillators, memory devices, and other electrical components. In one example, the controller 312 can include a timing device (e.g., a crystal-oscillator-based timing device). In another example, the controller 312 can include a computing device. The computing device can be configured substantially the same as computing device 702 of FIG. 7. A processor of the computing device (e.g., processor 704 of FIG. 7) can transmit signals to the pulser 304 to cause the pulser 304 to output optical pulses at particular times. The processor can also transmit signals to the shutter 308 to open the shutter 308 while optical pulses are being output by the pulser 304 and close the shutter 308 while the optical pulses are not being output by the pulser 304.

The transceiver 140 can include the detector 314. The detector 314 can detect the backscattered optical waves and generate associated electrical signals. In some examples, the detector 314 can include an amplifier 306b, a filter 322, an optical-to-electrical converter 318, an analog-to-digital converter 324, or any combination of these. For example, the detector 314 can include the amplifier 306b. The amplifier 306b can be configured substantially the same as the amplifier 306a. The amplifier 306b can be operable to receive optical waves from the optical-wave flow controller 310 and responsively amplify the optical waves. In some examples, the detector 314 can include a filter 322 (e.g., a bandpass filter). The filter 322 can receive optical waves (e.g., from the amplifier 306b) and responsively filter the optical waves. In some examples, the detector 314 can include an optical-to-electrical converter 318. The optical-to-electrical converter 318 can include a photodiode. The optical-to-electrical converter 318 can receive optical waves (e.g., from the filter 322) and responsively generate electrical signals associated with the optical waves. The electrical signals can be analog electrical signals. In some examples, the detector 314 can include an analog-to-digital converter 324. The analog-to-digital converter 324 can receive analog electrical signals (e.g., from the optical-to-electrical converter 318) and convert the electrical signals to digital signals.

In some examples, the transceiver 140 can be electrically coupled to a computing device 320. In some examples, the computing device 320 can be configured substantially the same as the computing device 702 of FIG. 7. The computing device 320 can receive electrical signals from the transceiver 140 (e.g., from the detector 314) and, based on a characteristic of the electrical signals, detect perturbations in one or more locations in the fiber optic cable 108. Examples of characteristics of the electrical signals can include amplitudes, phases, or frequencies of the electrical signals; times in which the electrical signals are received; data encoded within the electrical signals; or any combination of these. For example, the computing device 320 may determine a time difference between when an optical pulse is transmitted by the transceiver 140 and when a backscattered optical wave is received by the detector 314. The computing device 320 can determine the presence of, or a location of, a perturbation in the DAS system 300 based on the time difference.

Figure 7:
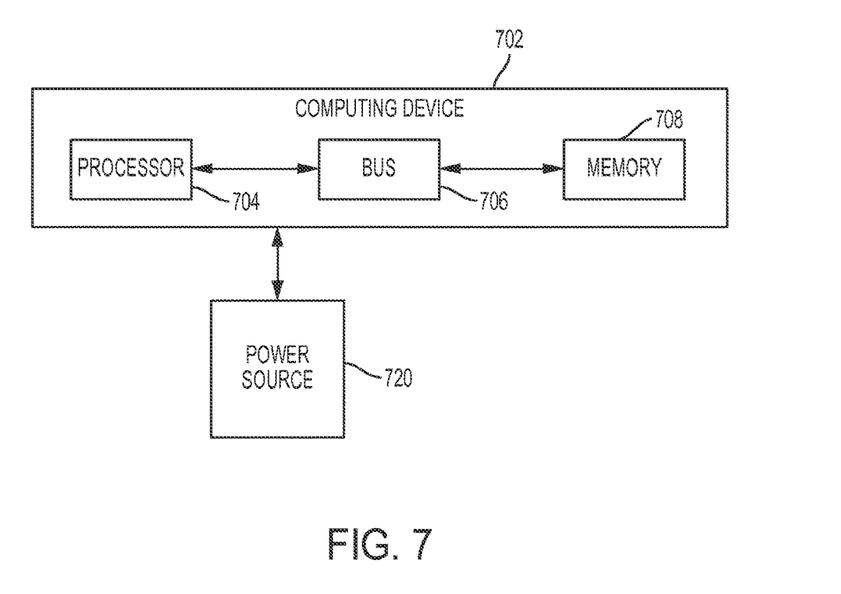
FIG. 7 is a block diagram of a computing device for use in a DAS system according to some aspects.

FIG. 7 is a block diagram of a computing device 702 for use in a DAS system according to some aspects. In some examples, the components shown in FIG. 6 (e.g., the computing device 702 and power source 720) can be integrated into a single structure. For example, the components can be within a single housing. In other examples, the components shown in FIG. 7 can be distributed (e.g., in separate housings) and in electrical communication with each other.

The computing device 702 can include a processor 704, a memory 708, and a bus 706. The processor 704 can execute one or more operations for operating the computing device 702. The processor 704 can execute instructions stored in the memory 708 to perform the operations. The processor 704 can include one processing device or multiple processing devices. Non-limiting examples of the processor 704 include a Field-Programmable Gate Array ("FPGA"), an application-specific integrated circuit ("ASIC"), a microprocessor, etc.

The processor 704 can be communicatively coupled to the memory 708 via the bus 706. The non-volatile memory 708 may include any type of memory device that retains stored information when powered off. Non-limiting examples of the memory 708 include electrically erasable and programmable read-only memory ("EEPROM"), flash memory, or any other type of non-volatile memory. In some examples, at least some of the memory 708 can include a medium from which the processor 704 can read instructions. A computer-readable medium can include electronic, optical, magnetic, or other storage devices capable of providing the processor 704 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 708 can include instructions for causing the processor 704 to receive, demodulate, and/or process electrical signals output by a transceiver (e.g., to determine the baseline optical noise signal 504 and optical noise signal 502 of FIG. 5). For example, the memory 708 can include instructions for causing the processor 704 to receive and demodulate electrical signals from a detector (e.g., detector 314 of FIG. 3). The memory 708 can further include instructions for filtering, or normalizing data associated with, the demodulated electrical signals.

The computing device 702 can include or can be coupled to a power source 720. In some examples, the power source 720 can include a battery (e.g., for powering the computing device 702). In other examples, the power source 720 can include an interface for electrically coupling the computing device 702 to an electrical cable (e.g., a wireline).

Figure 8:
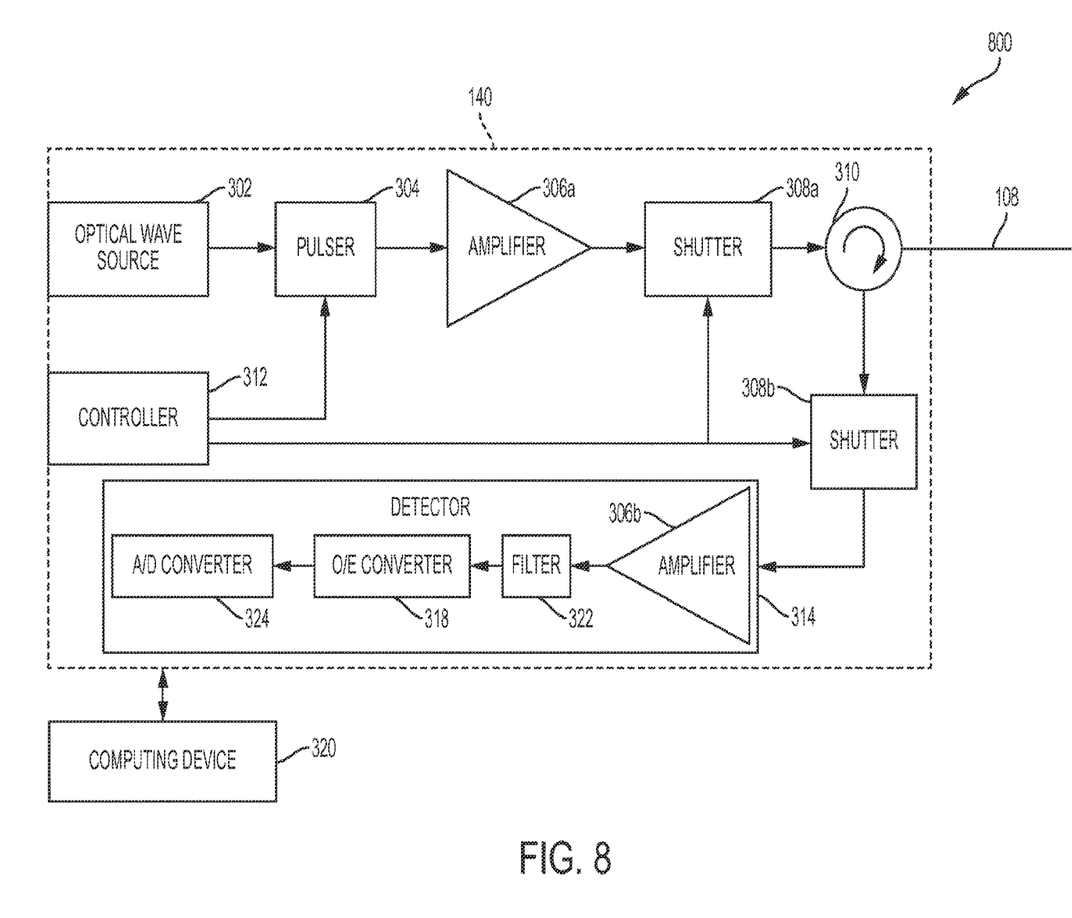
FIG. 8 is a block diagram of an example of a DAS system according to some aspects.

FIG. 8 is a block diagram of an example of a DAS system 800 according to some aspects. The DAS system 800 can include multiple shutters 308a-b. For example, one shutter 308a can be positioned between the amplifier 306 and the optical-wave flow controller 310. In some examples, shutter 308a can function substantially as described with respect to shutter 308 of FIG. 3. Another shutter 308b can be positioned elsewhere in the DAS system 800, such as between the optical-wave flow controller 310 and the detector 314.

The controller 312 can operate the shutter 308b. In some examples, the shutter 308b can prevent optical waves from saturating the detector 314. For example, the transceiver 140 can transmit an optical pulse down the fiber optic cable 108. Scatter sites in the fiber optic cable 108 can cause backscattered optical waves to propagate back toward the transceiver 140. The controller 312 can open the shutter 308b to allow the backscattered optical waves to reach the detector 314. In some examples, other optical waves (e.g., the optical pulse and/or optical noise) can be reflected back toward the transceiver 140, for example, upon the optical pulse reaching a high-reflection terminator at the end of the fiber optic cable 108. The controller 312 can close the shutter 308*b* to prevent the other optical waves from reaching the detector 314. In this manner, the shutter 308*b* can selectively attenuate the other optical waves to reduce or prevent saturation of the detector 314.

In some aspects, systems and methods for reducing noise in a distributed acoustic sensing system downhole are provided according to one or more of the following examples:

EXAMPLE #1

A distributed acoustic sensing system for use in a wellbore can include a shutter. The shutter can be positioned between an amplifier and an optical-wave flow controller of the distributed acoustic sensing system for reducing optical noise in the distributed acoustic sensing system. The distributed acoustic sensing system can also include a controller. The controller can be operable to transmit a signal to the shutter to (i) open the shutter for allowing an optical pulse to transmit through the shutter, and (ii) close the shutter for preventing an extraneous optical waveform, that generates at least part of the optical noise, from transmitting through the shutter.

EXAMPLE #2

The distributed acoustic sensing system of Example #1 may feature an optical wave source that is operable to generate a continuous optical waveform and transmit the continuous optical waveform. The distributed acoustic sensing system may also feature a pulser that is operable to receive the continuous optical waveform from the optical wave source and output the optical pulse to the amplifier. The amplifier can be configured for increasing an amplitude of the optical pulse, transmitting the optical pulse to the optical-wave flow controller, and generating the extraneous optical waveform. The optical-wave flow controller can be configured for receiving the optical pulse from the shutter and transmitting the optical pulse through a fiber optic cable.

EXAMPLE #3

The distributed acoustic sensing system of Example #2 may feature the optical wave source including a laser, the amplifier including an Erbium-doped fiber amplifier, the optical-wave flow controller including a circulator, and the shutter including a variable optical attenuator.

EXAMPLE #4

The distributed acoustic sensing system of any of Examples #2-3 may feature the fiber optic cable being coupled to the optical-wave flow controller and positioned in a casing string or a cement sheath.

EXAMPLE #5

The distributed acoustic sensing system of any of Examples #2-3 may feature the fiber optic cable being coupled to the optical-wave flow controller and positioned in a wireline for suspending a well tool in the wellbore.

EXAMPLE #6

The distributed acoustic sensing system of any of Examples #1-5 may feature a second shutter. The second shutter can be positioned between the optical-wave flow controller and a detector of the distributed acoustic sensing system for reducing the optical noise in the distributed acoustic sensing system. The controller can be further operable to (i) open the second shutter to allow a backscattered optical wave to transmit to the detector, and (ii) close the second shutter to prevent the optical noise from transmitting to the detector.

EXAMPLE #7

The distributed acoustic sensing system of Example #6 may feature a fiber optic cable coupled to the optical-wave flow controller. The distributed acoustic sensing system may also feature a sensor coupled to the fiber optic cable and comprising a reflective surface. The reflective surface can be positioned to generate at least a portion of the optical noise.

EXAMPLE #8

A system can include an amplifier operable to receive an optical pulse from a pulser, increase a magnitude of the optical pulse, and transmit the optical pulse. The system can also include a shutter for receiving the optical pulse. The shutter can be operable to (i) open for allowing the optical pulse to transmit through the shutter, and (ii) close for preventing an extraneous optical waveform that is output by the amplifier from transmitting through the shutter. The system can also include a controller operable to cause the shutter to open or close based on a time in which the pulser outputs the optical pulse.

EXAMPLE #9

The system of Example #8 may feature an optical wave source operable to generate a continuous optical waveform and transmit the continuous optical waveform. The system may also feature an optical-wave flow controller for receiving the optical pulse from the shutter and transmitting the optical pulse through a fiber optic cable. The pulser can be configured for receiving the continuous optical waveform from the optical wave source and outputting the optical pulse to the amplifier.

EXAMPLE #10

The system of Example #9 may feature the optical wave source including a laser, the amplifier including an Erbium-doped fiber amplifier, the optical-wave flow controller including a circulator, and the shutter including a variable optical attenuator.

EXAMPLE #11

The system of any of Examples #9-10 may feature the fiber optic cable being coupled to the optical-wave flow controller and positioned in a casing string or a cement sheath.

EXAMPLE #12

The system of any of Examples #9-10 may feature the fiber optic cable being coupled to the optical-wave flow controller and positioned in a wireline for suspending a well tool in a wellbore.

EXAMPLE #13

The system of any of Examples #8-12 may feature a second shutter. The second shutter can be positioned between an optical-wave flow controller and a detector for reducing optical noise associated with a reflected optical waveform. The controller can be further operable to (i) open the second shutter to allow a backscattered optical wave to transmit to the detector, and (ii) close the second shutter to prevent the optical noise from transmitting to the detector.

EXAMPLE #14

The system of Example #13 may feature a fiber optic cable coupled to the optical-wave flow controller. The system may also feature a sensor coupled to the fiber optic cable and comprising a reflective surface. The reflective surface can be positioned to generate the reflected optical waveform.

EXAMPLE #15

The system of any of Examples #8-14 may feature a distributed acoustic sensing system including the amplifier, the shutter, and the controller.

EXAMPLE #16

A system can include a shutter positioned in an interrogator of a distributed acoustic sensing system. The shutter can be operable to receive a signal from a controller for causing the shutter to (i) allow an optical pulse to transmit through the shutter, and (ii) prevent an extraneous optical waveform that is output by an amplifier of the interrogator from transmitting through the shutter.

EXAMPLE #17

The system of Example #16 may feature the interrogator further including an optical wave source operable to generate a continuous optical waveform and transmit the continuous optical waveform. The interrogator may also include a pulser operable to receive the continuous optical waveform from the optical wave source and output the optical pulse to the amplifier. The interrogator may further include an optical-wave flow controller for receiving the optical pulse from the shutter and transmitting the optical pulse through a fiber optic cable. The amplifier can be configured for receiving the optical pulse, increasing a magnitude of the optical pulse, and transmitting the optical pulse to the shutter.

EXAMPLE #18

The system of Example #17 may feature the optical wave source including a laser, the amplifier including an Erbium-doped fiber amplifier, the optical-wave flow controller including a circulator, and the shutter including a variable optical attenuator.

EXAMPLE #19

The system of any of Examples #17-18 may feature the fiber optic cable being coupled to the optical-wave flow controller and positioned in a casing string, a cement sheath, or a wireline for suspending a well tool in a wellbore.

EXAMPLE #20

The system of any of Examples #16-19 may feature a second shutter. The second shutter can be positioned between an optical-wave flow controller and a detector for reducing optical noise associated with a reflected optical waveform. The second shutter can be operable to receive another signal from the controller for causing the second shutter to (i) open to allow a distributed backscattered optical signal to transmit to the detector, and (ii) close to prevent the optical noise from transmitting to the detector.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A distributed acoustic sensing system for use in a wellbore, the distributed acoustic sensing system comprising:
    a pulser operable to receive a continuous optical waveform from an optical wave source and output an optical pulse;
    a shutter positioned between the pulser and an optical-wave flow controller of the distributed acoustic sensing system for reducing optical noise in the distributed acoustic sensing system; and
    a controller communicatively coupled to the pulser and the shutter, the controller being operable to control when the optical pulse is output by the pulser and correspondingly switch the shutter from (i) a closed configuration for preventing an extraneous optical waveform from transmitting through the shutter to (ii) an open configuration for allowing the optical pulse to transmit through the shutter, wherein the extraneous optical waveform generates at least part of the optical noise.

2. The distributed acoustic sensing system of claim 1, further comprising:
    the optical wave source operable to generate the continuous optical waveform and transmit the continuous optical waveform to the pulser; and
    an amplifier positioned between the pulser and the shutter, the amplifier being configured for increasing an amplitude of the optical pulse, transmitting the optical pulse to the optical-wave flow controller, and generating the extraneous optical waveform; and
    wherein the optical-wave flow controller is configured for receiving the optical pulse from the shutter and transmitting the optical pulse through a fiber optic cable.

3. The distributed acoustic sensing system of claim 2, wherein the optical wave source comprises a laser, the amplifier comprises an Erbium-doped fiber amplifier, the optical-wave flow controller comprises a circulator, and the shutter comprises a variable optical attenuator.

4. The distributed acoustic sensing system of claim 2, further comprising the fiber optic cable coupled to the optical-wave flow controller and positioned in a casing string or a cement sheath.

5. The distributed acoustic sensing system of claim 2, further comprising the fiber optic cable coupled to the optical-wave flow controller and positioned in a wireline for suspending a well tool in the wellbore.

6. The distributed acoustic sensing system of claim 1, further comprising:
    a second shutter positioned between the optical-wave flow controller and a detector of the distributed acoustic sensing system for reducing the optical noise in the distributed acoustic sensing system, wherein the controller is further communicatively coupled to the second shutter and operable to (i) open the second shutter to allow a backscattered optical wave to transmit to the detector, and (ii) close the second shutter to prevent the optical noise from transmitting to the detector.

7. The distributed acoustic sensing system of claim 6, further comprising:
a fiber optic cable coupled to the optical-wave flow controller; and
a sensor coupled to the fiber optic cable and comprising a reflective surface positioned to generate at least a portion of the optical noise.

8. A system comprising:
an amplifier operable to receive an optical pulse from a pulser, increase a magnitude of the optical pulse, and transmit the optical pulse;
a shutter for receiving the optical pulse and operable to (i) open for allowing the optical pulse to transmit through the shutter, and (ii) close for preventing an extraneous optical waveform that is output by the amplifier from transmitting through the shutter; and
a controller communicatively coupled to the pulser and the shutter, the controller being operable to cause the shutter to open or close based on a time at which the pulser outputs the optical pulse.

9. The system of claim 8, further comprising:
an optical wave source operable to generate a continuous optical waveform and transmit the continuous optical waveform; and
an optical-wave flow controller for receiving the optical pulse from the shutter and transmitting the optical pulse through a fiber optic cable,
wherein the pulser is configured for receiving the continuous optical waveform from the optical wave source and outputting the optical pulse to the amplifier.

10. The system of claim 9, wherein the optical wave source comprises a laser, the amplifier comprises an Erbium-doped fiber amplifier, the optical-wave flow controller comprises a circulator, and the shutter comprises a variable optical attenuator.

11. The system of claim 9, further comprising the fiber optic cable coupled to the optical-wave flow controller and positioned in a casing string or a cement sheath.

12. The system of claim 9, further comprising the fiber optic cable coupled to the optical-wave flow controller and positioned in a wireline for suspending a well tool in a wellbore.

13. The system of claim 8, further comprising:
a second shutter positioned between an optical-wave flow controller and a detector for reducing optical noise associated with a reflected optical waveform,
wherein the controller is further operable to (i) open the second shutter to allow a backscattered optical wave to transmit to the detector, and (ii) close the second shutter to prevent the optical noise from transmitting to the detector.

14. The system of claim 13, further comprising:
a fiber optic cable coupled to the optical-wave flow controller; and
a sensor coupled to the fiber optic cable and comprising a reflective surface positioned to generate the reflected optical waveform.

15. The system of claim 8, further comprising a distributed acoustic sensing system comprising the amplifier, the shutter, and the controller.

16. A system comprising:
a shutter positioned in an interrogator of a distributed acoustic sensing system and operable to receive a signal from a controller for causing the shutter to (i) allow an optical pulse to transmit through the shutter, and (ii) prevent an extraneous optical waveform that is output by an amplifier of the interrogator from transmitting through the shutter.

17. The system of claim 16, wherein the interrogator further comprises:
an optical wave source operable to generate a continuous optical waveform and transmit the continuous optical waveform;
a puller operable to receive the continuous optical waveform from the optical wave source and output the optical pulse to the amplifier; and
an optical-wave flow controller for receiving the optical pulse from the shutter and transmitting the optical pulse through a fiber optic cable,
wherein the amplifier is configured for receiving the optical pulse, increasing a magnitude of the optical pulse, and transmitting the optical pulse to the shutter.

18. The system of claim 17, wherein the optical wave source comprises a laser, the amplifier comprises an Erbium-doped fiber amplifier, the optical-wave flow controller comprises a circulator, and the shutter comprises a variable optical attenuator.

19. The system of claim 17, further comprising the fiber optic cable coupled to the optical-wave flow controller and positioned in a casing string, a cement sheath, or a wireline for suspending a well tool in a wellbore.

20. The system of claim 16, further comprising:
a second shutter positioned between an optical-wave flow controller and a detector for reducing optical noise associated with a reflected optical waveform,
wherein the second shutter is operable to receive another signal from the controller for causing the second shutter to (i) open to allow a distributed backscattered optical signal to transmit to the detector, and (ii) close to prevent the optical noise from transmitting to the detector.

* * * * *

UNITED STATES PATENT AND TRADEMARK OFFICE
CERTIFICATE OF CORRECTION

PATENT NO. : 10,309,825 B2
APPLICATION NO. : 15/554376
DATED : June 4, 2019
INVENTOR(S) : Kwang Il Suh and Ira Jeff Bush It is certified that error appears in the above-identified patent and that said Letters Patent is hereby corrected as shown below:

In the Claims

Claim 17, Column 14, Line 26, please replace "puller" with -- pulser --

Signed and Sealed this
Twenty-seventh Day of August, 2019

Andrei Iancu
*Director of the United States Patent and Trademark Office*